United States Patent Office 3,216,314
Patented Nov. 9, 1965

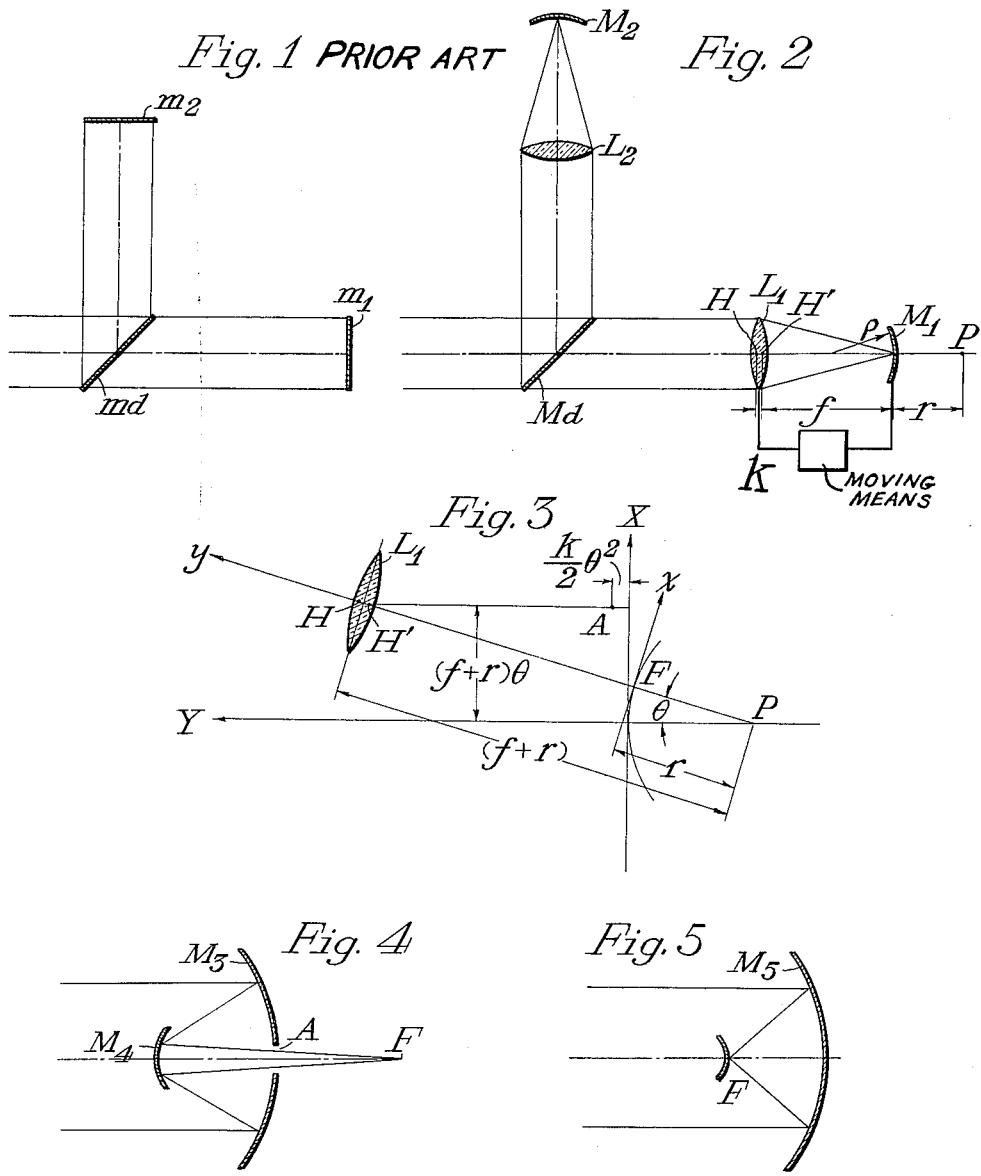

3,216,314
INTERFERENCE COMPARATOR SYSTEM HAVING BEAM SPLITTER MEANS AND REFERENCE REFLECTOR MEANS
Tadashi Morokuma, Tokorozawa, Japan, assignor to Olympus Kogaku Kogyo Kabushiki-Kaisha, Tokyo, Japan, a corporation of Japan
Filed Sept. 21, 1961, Ser. No. 139,688
5 Claims. (Cl. 88—14)

This invention relates to improvements in an interference comparator system of the Michelson type.

It has already been known that the Michelson interferometer can be used to precisely measure a length of an article to be measured by utilizing a periodical change in the brightness of the interference fringe produced by the interferometer. In this case it may be preferred to use a corner cube as a reflecting means for reflecting a coherent ray of light. However, it is actually waste of time and labor to satisfactorily manufacture such a corner cube because of the extremely high accuracy required for that purpose.

It is, therefore, an object of the invention to provide in an interference comparator system of the Michelson type a reflector unit for reflecting a coherent ray of light having a performance capable of comparing with the abovementioned corner cube and being more readily manufactured than the same.

Another object of the invention is to provide an interference comparator system of the Michelson type capable of being manufactured by machines having relatively low accuracies in working.

According to the invention there is provided an interference comparator system comprising beam splitter means for splitting a substantially parallel beam of light incident thereupon into a transmitted beam and a reflected beam, movable reflector means for reflecting the transmitted beam to said beam splitter means and adapted to be moved toward and away from said beam splitter means, and reference reflector means for reflecting the reflected beam to said beam splitter means. Said movable reflector means comprise a reflector unit consisting of a convergent image forming system substantially free from any spherical aberration and a spherical mirror connected integrally with the same and having its vertex at the rear focus of the image forming system and its spherical reflecting surface facing the image forming system.

Preferably, the reflecting surface of the spherical mirror has its radius of curvature $\rho$ defined by the expression $$\rho = \frac{f^2}{r+k+2f}$$

where $f$ represents the rear focal length of the image forming system, $r$ a distance between the vertex of the reflecting surface of the mirror and a point lying on the optical axis of the reflector unit, said point depending upon a position of a measuring head or an article to be measured, and $k$ represents a distance between the front and rear principal points of the image forming system.

If the reflector unit is likely to be inclined at a very small angle to the direction of the beam incident thereupon during its movement a plane mirror may be advantageously used instead of the spherical mirror.

The invention will become more readily apparent from the following detailed description taken in conjunction with the accompanying drawings in which:

FIG. 1 shows diagrammatically a fragmental view of an optical system in the Michelson interferometer;

FIG. 2 shows diagrammatically a fragmental view of an interference comparator system constructed in accordance with the teachings of the invention;

FIG. 3 shows a diagrammatical view illustrating the operation of the invention;

FIG. 4 shows another embodiment of the invention; and

FIG. 5 shows still another embodiment of the invention.

Referring now to FIG. 1 of the drawings, there is shown diagrammatically a fragmental view of an optical system in the Michelson interferometer. A ray of light emanating from a source of light (not shown) falls at an angle of 45° upon a beam splitter such as a half-silvered mirror $m_d$ where it is divided into a transmitted ray which passes to a movable plane mirror $m_1$ and a reflected ray which passes to reference plane mirror $m_2$. These two mirrors $m_1$ and $m_2$ reflect the rays back to the mirror $m_d$ where the ray from $m_2$ is reflected while the ray from $m_1$ is transmitted. Thus the two rays come to interfere with each other. If the mirror $m_1$ moves rightwards or leftwards as viewed in FIG. 1, the brightness of the interference fringe is periodically changed due to a difference between the paths of the two rays. As well known, this interference phenomenon is utilized to precisely measure length.

In effecting such measurement it is to be noted that the coherent ray of light reflected from the movable mirrors $m_1$ should travel in the reverse direction along the initial path in which the ray divided by the mirror $m_d$ has passed to the movable mirror $m_1$. For this purpose a corner cube may be used as means for reflecting the coherent ray to the mirror $m_d$. However, it is actually a waste of time and labor to satisfactorily manufacture such a corner cube because of the extremely high accuracy required to do so. The invention is intended to avoid this difficulty.

Referring now to FIG. 2 of the drawings, there is diagrammatically illustrated the essential part of an interference comparator system constructed in accordance with the teachings of the invention. As in the arrangement shown in FIG. 1, a ray or beam of light emanating from a source of light (not shown) falls at an angle of 45° upon a beam splitter $M_d$ such as a half-silvered mirror where the same is split up into a transmitted ray and a reflected ray.

According to the invention, the mirror $m_1$ shown in FIG. 1 is replaced by a reflector unit consisting of a convergent image forming system which is represented by a single convex lens and a spherical mirror as shown in FIG. 2. It is to be noted that the reference mirror $m_2$ is not necessarily replaced by the reflector unit abovementioned. It is also to be noted that the reference mirror $m_2$ may be replaced by any other reflecting unit like a corner cube. It is desirable, however, that reflector units for reflecting the transmitted and reflected rays to the beam splitter respectively are similar to each other in construction as shown in FIG. 2.

The reflector unit includes a convergent image forming system $L_1$ substantially free from any spherical aberration, and a spherical mirror $M_1$ connected integrally with the same and having its vertex at the rear focus of the image forming system and its spherical reflecting surface facing the image forming system. As shown in FIG. 2, the substantially parallel beam of light transmitted through the beam splitter $M_d$ is focussed at the vertex of the spherical mirror $M_1$ by the convergent image forming system $L_1$. This image forming system $L_1$ cooperates with the spherical mirror $M_1$ to convert the focussed beam into a substantially parallel beam travelling in the reverse direction toward the beam splitter $M_d$ along the initial path in which the beam transmitted through the splitter has passed to the reflector unit $L_1$–$M_1$. Similarly the beam reflected from the beam splitter is reflected from the associated reflector unit $L_2$–$M_2$ and reflected back the beam splitter along the initial path in which it has passed to the reflector unit. Thus both the beams returned to the beam splitter will interfere with each other.

As in the conventional interference comparator systems, the reflector unit $L_1$–$M_1$ is adapted to be moved toward and away from the beam splitter by moving means, for example a mechanical feeding device such as a feed screw or the like (not shown) operatively connected thereto. During movement of the reflector unit relative to the beam splitter, the longitudinal axis of the former may be inclined with respect to the optical axis of the beam incident upon the same dependent upon the accuracy with which said feeding device and other mechanical parts have been machined. However, if the angle of inclination which is produced in such a case is small, the arrangement of the invention ensures that the beam of light reflected from the mirror $M_1$ and then emerging from the image forming system $L_1$ follows the initial path along which the beam has fallen upon the mirror $M_2$ as will be subsequently described.

With an image forming system free from any spherical aberration, a length of optical path from an object point to its image point through the image forming system always has a constant magnitude regardless of what portion of the image forming system the ray passes through. Therefore, a radius of curvature of a spherical mirror used can be determined taking into account the paraxial rays alone.

It is now assumed that the reflector unit $L_1$–$M_1$ is inclined by an angle $\theta$ about any point P lying on the optical axis of an optical system including a source of light (not shown), the beam splitter $M_d$ and the reflector unit $L_1$–$M_1$ (see FIG. 2). Also it is assumed that a rectangular coordinate system $x$–$y$ fixed to the reflector unit including the convergent image forming system $L_1$ and the spherical mirror $M_1$ has its origin at the rear focus of the image forming system with the $x$-axis extending in the direction of the optical axis thereof and the $y$-axis perpendicular to the $x$-axis and that another rectangular coordinate system X–Y fixed with respect to a space in which the reflector unit is disposed so as to be superposed on the coordinate system $x$–$y$ when $\theta=0$ (see FIG. 3).

Any ray passing through the rear principal point H' of the image forming system $L_1$ in parallel relationship to the Y-axis is not subjected to any change in path due to the inclination provided that it will be reflected from a point $Y=0$ without taking into account of any change in phase due to the inclination of the image forming system. A change in phase of the ray due to any inclination $\theta$ of the image forming system is represented by the expression $$\frac{k}{2}\theta^2 + ⊕\ (\theta^4) \quad (1)$$

where $k$ is a distance between the front and rear principal points H and H' respectively of the image forming system $L_1$ and $⊕(\theta^4)$ represents the terms higher than the fourth order of $\theta$. From this expression it will be seen that, if the abovementioned ray is reflected from a point $$Y = \frac{k}{2}\theta^2$$

the same has no change in phase due to the inclination of the reflector unit. According to the coordinate system X–Y the reflecting point just described has the coordinates $X=(f+r)\theta$ and $$Y = \frac{k}{2}\theta^2$$

corresponding to a point designated by "A" in FIG. 3 whereas according to the coordinate system $x$–$y$ the same as the coordinates $$x = f\theta$$

and $$y = \left(\frac{r}{2} + \frac{k}{2} + f\right)\theta^2 \quad (2)$$

where $f$ represents the rear focal length of the image forming system $L_1$, $r$ a distance between the point P and a vertex of a reflecting mirror, and $k$ and $\theta$ have the same meaning as in the previous Expression 1. With the surface defined by the Expression 2 near $\theta=0$ approximating a portion of a spherical surface, the latter has a radius of curvature $\rho$ defined by the expression $$\rho = \frac{f^2}{r+k+2f} \quad (3)$$

With a reflector unit disposed at a rear focus of a convergent image forming system and a spherical mirror having its radius of curvature just described, a ray of light passing through the same has a phase not affected by the inclination of the reflector unit.

Assuming that the three parameters $f$, $k$ and $r$ are predetermined, the radius of curvature of the spherical mirror can readily be calculated from the Expression 3. Alternatively, if the parameters $f$, $k$ and $\rho$ are predetermined, the magnitude of the parameter $r$ can be calculated by solving the Expression 3 as to $r$.

From the deduction of the Expression 3 thus far described it is apparent that the expression is intimately related to the inclination of the reflector unit resulting from the mechanical feeding device therefor. If said mechanical feeding device per se will have any inclination a measuring terminal must have its position properly fixed with respect to the point P. For example, if the measuring terminal has its extremity in the form of spherical surface, the same should have its center of curvature coinciding with the point P.

With the feeding device having a high accuracy and with the inclination $\theta$ small, however, a sufficiently high accuracy in measurement can be obtained even in the case where the center of curvature of the measuring terminal departs more or less from the point P along the optical axis. On the contrary, if the feeding device has a low accuracy and if the inclination $\theta$ is large, then the center of curvature of the measuring terminal is required to coincide with the point with a high accuracy.

It is now assumed that the measuring terminal does not occupy its proper position with respect to the point P and departs from the same by a distance $l$ in the direction of optical axis. For the maximum inclination $\theta_m$ of the reflector unit due to the feeding device, the maximum error in measurement is $l\theta_m^2/2$. As an example, $l=100$ mm. and $\theta_m=10^{-4}$ radians will result in an error of $0.0005\mu$ which is actually negligible. However, $\theta_m=10^{-3}$ radians will result in an error of $0.05\mu$. In this case, the measuring terminal must be positioned accurately with respect to the point P.

If an plane mirror were used instead of the spherical mirror, then $Y=-(K+2f)$ because its radius of curvature is infinitely large. As an example, $r=-200$ mm. for $f=100$ mm. and $k=0$. This means that the point P is positioned on that side of the mirror facing the image forming system. If the measuring terminal is secured in a position on that side of the mirror opposite to the image forming system and separated by a distance of 100 mm. from the mirror, then $l$ will amount to the order of 300 mm. In this case, $\theta_m=10^{-3}$ radians gives an error of approximately $0.15\mu$. Therefore, a plane mirror may be used. In other words, if the reflector unit is such that its longitudinal axis is capable of being inclined only at a very small angle to an optical axis of a ray incident thereupon, then a plane mirror may be used without an appreciable error in measurement.

In summary, the radius of curvature of the reflecting mirror is required to be determined such that the position of the measuring terminal does not deviate from the point P to a very great extent.

Instead of the convergent lens $L_1$ mirror means may be equally used as shown in FIG. 4 or 5.

In FIG. 4 an image forming system consists of a relatively large concave mirror $M_3$ including a window A formed in its middle portion on a small concave mirror $M_4$ having its reflecting concave surface facing the concave mirror $M_3$ and substantially aligned with the window A with a suitable spacing maintained therebetween. A beam of light transmitted through a beam splitter such as that shown in FIG. 2 is incident upon the mirror $M_3$ where the same is converged and reflected to the mirror $M_4$ which, in turn reflects the converging beam toward the mirror $M_3$. The reflected beam is passed through the window A on the mirror $M_3$ and focussed at a point F lying rearwards of the same by the action of both mirror $M_3$ and $M_4$. It is to be understood that a spherical mirror is disposed at the point F in the same manner as previously described in conjunction with the FIG. 2 system. Thus it will be seen that the focussed beam is reflected from the spherical mirror toward the beam splitter as in the previous case. It is to be also understood that the concave mirror $M_3$ and $M_4$ and the spherical mirror disposed rearwards of the mirror $M_3$ with respect to the beam splitter are arranged to be movable as a unit.

In FIG. 5 an image forming system comprises a concave mirror $M_5$ facing a beam splitter (not shown). A beam of light transmitted through the beam splitter falls on the mirror $M_5$ which, in turn focusses the same at a point F, at which a spherical mirror such as that previously described in conjunction with FIG. 2 is disposed. As shown in FIG. 5, the spherical mirror is disposed on the side of the image forming concave mirror near the beam splitter but it will be readily appreciated that the concave mirror $M_5$ has the same function as does any image forming system previously described.

While the invention has been described in conjunction with certain embodiments thereof it is to be understood that various changes and modifications may be made without departing from the spirit and scope of the invention. For example, any suitable combination of lenses or mirrors or lenses and mirrors may be equally used in forming the reflector unit.

What I claim is:

1. In an interference comparator system having beam splitter means for splitting a substantially parallel beam of light incident thereupon into a transmitted beam and a reflected beam, and reference reflector means for reflecting the reflected beam to said beam splitter means, the improvement comprising reflector means for reflecting the transmitted beam to said beam splitter means and means on which said reflector means is mounted for moving said reflector means toward and away from said beam splitter means, said reflector means consisting of a convergent image forming system substantially free from any spherical aberation and a spherical mirror connected integrally with the same and having its vertex at the rear focus of said image forming system and its spherical reflecting surface facing the image forming system, said spherical reflecting surface being curved such that when said reflector means is tilted about a point on the optical axis which axis has the beam splitter means, the image forming system and the spherical mirror thereon, which point is spaced from the spherical mirror, phase changes of the transmitted beam caused by its passage through the titled image forming system are compensated.

2. The improvement as claimed in claim 1 in which said convergent image forming system is a convergent lens.

3. The improvement as claimed in claim 1 in which said convergent image forming system is a large concave mirror having an aperture in the center thereof, and a small concave mirror facing the concave side of said large concave mirror and aligned with said aperture.

4. The improvement as claimed in claim 1 in which said convergent image forming system is a large concave mirror.

5. An interference comparator system as claimed in claim 1, wherein the reflecting surface has its radius of curvature $\rho$ defined by the expression $$\rho = \frac{f^2}{r+k+2f}$$

where $f$ represents the rear focal length of the image forming system, $r$ a distance between the vertex of the reflecting surface of the mirror and a point lying on the optical axis of the reflector unit rearwards of the mirror and depending upon the position of an object to be measured, and $k$ represents a distance between the front and rear principal points of the image forming system.

References Cited by the Examiner

UNITED STATES PATENTS 2,601,175   6/52   Smith _____ 88—14 X
2,688,899   9/54   Rantsch _____ 88—14 X

OTHER REFERENCES

National Physical Laboratory Symposium No. 11, "Interferometry"; printed in London by Her Majesty's Stationary Office in 1960; symposium held on 9th, 10th and 11th June 1959, pages 458–460 relied on.

JEWELL H. PEDERSEN, Primary Examiner.

EMIL G. ANDERSON, Examiner.